(12) United States Patent
Griffin et al.

(10) Patent No.: US 7,783,573 B2
(45) Date of Patent: Aug. 24, 2010

(54) PERFORMANCE OPTIMIZED SMARTCARD TRANSACTION MANAGEMENT

(75) Inventors: Daniel C. Griffin, Seattle, WA (US);
Eric C. Perlin, Redmond, WA (US);
Klaus U. Schutz, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1462 days.

(21) Appl. No.: 10/756,045

(22) Filed: Jan. 13, 2004

(65) Prior Publication Data

US 2005/0154672 A1 Jul. 14, 2005

(51) Int. Cl.
*G06Q 99/00* (2006.01)
(52) U.S. Cl. .......................................... 705/50; 726/27
(58) Field of Classification Search ............... 705/50–79
See application file for complete search history.

(56) References Cited

U.S. PATENT DOCUMENTS

| 5,461,217 | A | * | 10/1995 | Claus ........................ 235/380 |
| 6,108,789 | A | | 8/2000 | Dancs et al. |
| 6,112,246 | A | | 8/2000 | Horbal et al. |
| 6,535,997 | B1 | * | 3/2003 | Janson et al. ................. 714/15 |
| 6,676,022 | B1 | * | 1/2004 | Guthery et al. ............. 235/492 |
| 6,865,647 | B2 | | 3/2005 | Olarig et al. |
| 2002/0026578 | A1 | | 2/2002 | Hamann et al. |
| 2003/0080852 | A1 | * | 5/2003 | Harris ........................ 340/5.54 |
| 2003/0093670 | A1 | * | 5/2003 | Matsubayashi et al. ..... 713/168 |
| 2003/0126441 | A1 | * | 7/2003 | Laux et al. .................. 713/168 |
| 2005/0076198 | A1 | | 4/2005 | Skomra et al. |

OTHER PUBLICATIONS

White, "How Computers Work," Millennium Edition, 1999, Que Corporation, Indianapolis, IN, all pages.*
Derfler, "How Networks Work," Bestseller Edition, 1996, Ziff-Davis Press, Emeryville, CA, all pages.*
Gralla, "How the Internet Works," Millennium Edition, 1999, Que Corporation, Indianapolis, IN, all pages.*
Muller, "Desktop Encyclopedia of the Internet," 1999, Artech House Inc., Norwood, MA, all pages.*
Rankl et al., "Smart Card Handbook," Second Edition, 2000, Wiley & Sons, all pages.*
Chen, "Java Card Technology for Smart Cards," 2000, Prentice Hall, all pages.*

* cited by examiner

*Primary Examiner*—Andrew J. Fischer
*Assistant Examiner*—Jacob C. Coppola
(74) *Attorney, Agent, or Firm*—Lee & Hayes, PLLC

(57) ABSTRACT

Methods and apparatuses are provided for use with smartcards or other like shared computing resources. By selectively granting exclusive use to a requesting entity for a period of time, performance is improved by reducing unnecessary redundant overhead data, communication, storage and/or processing for an applicable series of transactions associated with a granted access request operation.

2 Claims, 5 Drawing Sheets

PERFORMANCE OPTIMIZED SMARTCARD TRANSACTION MANAGEMENT

TECHNICAL FIELD

The present invention relates generally to computers and like devices, and more particularly to improved methods and apparatuses for use in managing access to smartcards and other like sharable computing resources.

BACKGROUND

Smartcards are portable devices that include logic and memory circuitry configured to interact with computers and other like devices. In a typical computer implementation, a computer includes or is otherwise connected to a smartcard interface device that operatively interacts with the smartcard to provide connectivity to the circuitry of the smartcard for applications and/or other processes operating within the computer. Once the applicable connections are made, the smartcard circuitry can operate as designed/programmed and begin processing requests received from the computer and/or otherwise support the operations of the computer.

Smartcards and other mechanisms like them can be configured to support a wide variety of functions. By way of example, a smartcard may be configured to support user verification, service authorization and cryptographic processes. The circuitry on such smartcards typically includes processing logic and static memory that allows secret/preparatory data to be processed and stored within the smartcard in a secure manner.

Currently there are a variety of different manufactures designing and building smartcards, and hence there are different circuits with these smartcards. The smartcards are each designed to comply with certain standards, e.g., regarding the physical design, power requirements, communication interface, etc. This standardization allows different smartcards to utilize common smartcard interface devices, such as smartcard reader/writer devices that connect to computers.

One a smartcard is operatively coupled to a computer (or other like device) then processes operating within the computer can send access requests to the smartcard through the established communication interface. For example, a software application running on a computer processing unit may request access to the smartcard by generating a smartcard access request to which the smartcard is responsive in some manner. For example, a smartcard may respond to the command(s) stated in a smartcard access request by processing some data and outputting data to the requesting software application, process and/or other like entity.

Since a smartcard can be accessed by a plurality of such entities, there is a need to control access to the smartcard. Typically, a smartcard is designed to handle only one command sequence at a time. As such, arbitration logic or other like logic is usually provided to guard against multiple simultaneous command sequences, or access attempts. Such arbitration, or transaction, logic may be provided, for example, within the computer and/or smartcard interface device.

A typical command sequence, or transaction, provided to a smartcard includes an initialization sequence and one or more commands. Other data may also be included in certain transactions. The initialization sequence can be employed to verify that the smartcard is in a known state at the beginning of the transaction. Thus, for example, assume that a process running on the computer needs to access the smartcard and in doing so causes the smartcard to be configured in a certain way and/or store certain data in a particular way during a first transaction.

Next, assume that the process running on the computer itself performs some additional computations and then again accesses the smartcard with a second transaction. The initialization sequence in the second transaction can be employed to verify that the smartcard has not changed in some manner since the first transaction. If the smartcard has not been changed (e.g., accessed by some other process) since the first transaction, then the second transaction can be performed. If the smartcard has been changed since the first transaction, then the previous state of the smartcard will need to be re-established accordingly before the second transaction can be performed. Thus, as illustrated in the example, there is a need to transmit, receive and process such initialization information for each transaction. This added overhead may significantly reduce performance of the implicated processes.

Consequently, there is a need for methods and apparatuses that can improve the performance of smartcards and/or access thereto by various entities.

SUMMARY

The above-stated needs and others are met, for example by a method for use with a shared computing resource. The method includes selectively granting an access request for a shared computing resource, and establishing a timed exclusive use period starting with an initial transaction associated with the granted access request. Here, the initial transaction includes associated initiating sequence information. The method also includes, during the timed exclusive use period, receiving at least one subsequent transaction associated with the granted access request. The subsequent transaction does not include the associated initiating sequence information. The lack of need for such initiating sequence information reduces the overhead associated with the operation being conducting.

In certain implementations the shared computing resource includes a smartcard. Based on receipt of at least one subsequent transaction, the timed exclusive use period is re-started. The length of the timed exclusive use period may be static or dynamic. For example, the length of the exclusive use period may be based on various information including shared computing resource identifying information, shared computing resource usage information, access requesting entity identifying information, access requesting entity operation information, access requesting entity transaction information, access request traffic information, access request usage information, date/time information, and the like.

During the timed exclusive use period, when a transaction associated with a second access request is received, the second access request is at least temporarily halted.

In still other implementations, an apparatus is provided which includes a transaction manager. The transaction manager is configurable to receive at least one access request for a shared resource from a requesting entity. Here, the transaction manager may be operatively coupled to the shared computing resource. The transaction manager includes arbitration logic and transaction timer logic. The arbitration logic is configured to selectively grant the access request. The transaction timer logic is configured to establish a timed exclusive use period starting with receipt of an initial transaction associated with the granted access request. The initial transaction includes associated initiating sequence information. The transaction manager is further configured to receive at least one subsequent transaction associated with the granted access request during the timed exclusive use period. As a result, this subsequent transaction need not include the associated initiating sequence information.

In certain implementations, the shared computing resource includes a smartcard or other like mechanism. The transaction manager may be part of a computer system, a smartcard interface device, or other like device/appliance.

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Figure 1:
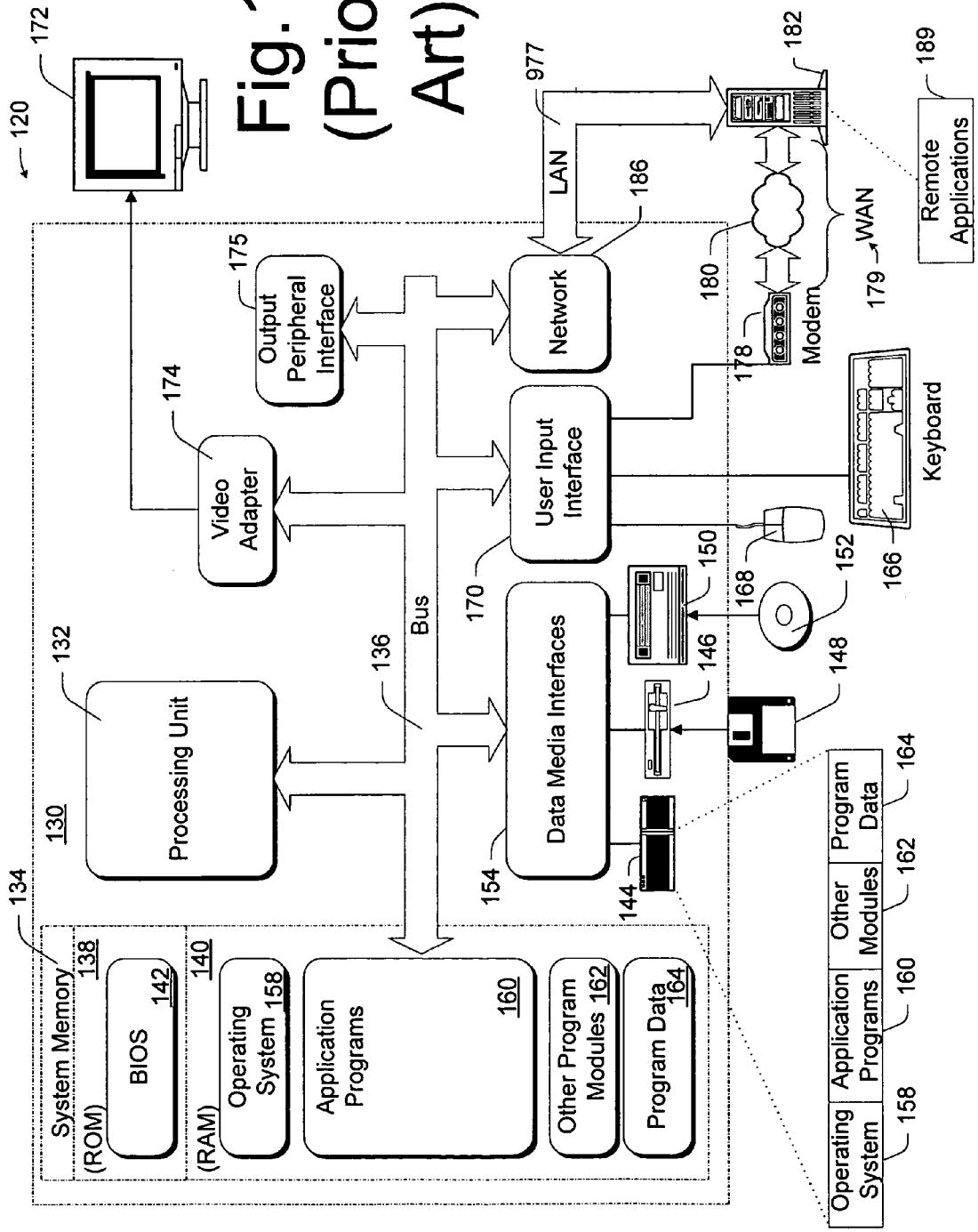
FIG. 1 is a block diagram that depicts a contemporary computer system that can be used with a smartcard or other like portable mechanism.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 with which the subsequently described methods and apparatuses may be implemented.

Exemplary computing environment 120 is only one example of a suitable computing environment and is not intended to suggest any limitation as to the scope of use or functionality of the improved methods and apparatuses described herein. Neither should computing environment 120 be interpreted as having any dependency or requirement relating to any one or combination of components illustrated in computing environment 120.

The improved methods and apparatuses herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and apparatuses described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Figure 2:
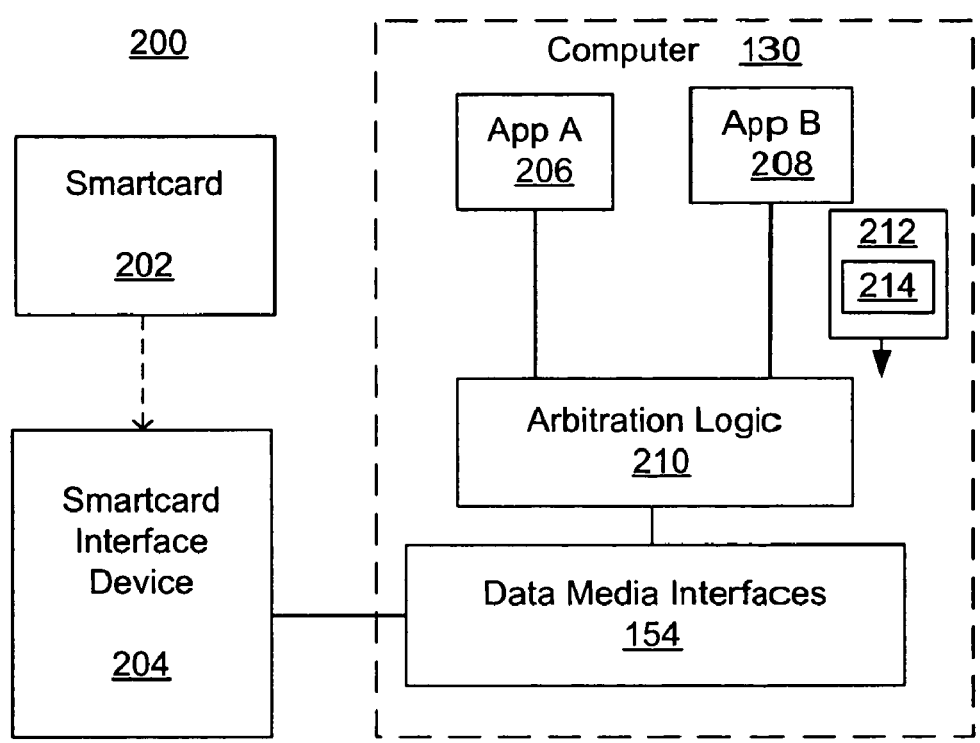
FIG. 2 is a block diagram depicting an example of a contemporary system, as in FIG. 1, being configured to support access to a smartcard or other like portable mechanism using arbitration logic.

Attention is now drawn to FIG. 2, which is a block diagram depicting an example of a contemporary system 200, as in FIG. 1, being configured to support access to a smartcard 202 or other like portable mechanism using arbitration logic 210.

As shown, system 200 includes computer 130 having, in this example, data media interfaces 154 operatively coupled to a smartcard interface device 204. Smartcard interface device 204 is configured to operatively couple to smartcard 202. Illustrated within computer 130, are applications (App A 206 and App B 208), which are each operatively configured to run using the resources of computer 130 as needed. Being so configured, both App A 206 and App B 208 are able to request access to smartcard 202 through arbitration logic 210, data media interfaces 154 and smartcard interface device 204. In certain implementations, for example, arbitration logic 210 may be provided as part of the operating system, as an application programming interface (API), and/or other suitable program mechanism.

In system 200, as described in the Background section above, each transaction 212 generated by either App A 206 or App B 208 needs to include an initialization sequence 214 (or other like information). As mentioned in the Background section above, in certain implementations generating, communicating, storing and/or processing initialization sequence 214 may reduce the performance of system 200. This is particularly likely when an on-going process generates a series of transactions as part of an on-going operation, and the initialization sequence is used to verify that the state of the smartcard has not changed in some manner that will affect the on-going operation and/or latest transaction.

To address this potential performance bottleneck and improve performance in most implementations, the methods and apparatuses described and shown in the exemplary implementations herein, use transaction manager logic to allow a series of transactions to occur while the smartcard is exclusively accessed by the requesting entity. Thus, for example, in certain exemplary methods and apparatuses, the transaction manager logic not only arbitrates between requesting entities but also establishes exclusive use periods during which an entity may send further transactions without initialization sequences. During such exclusive use periods, the state of the smartcard will not have been changed by other entities because the other entities are excluded from accessing the smartcard during the exclusive use period.

Figure 3A:
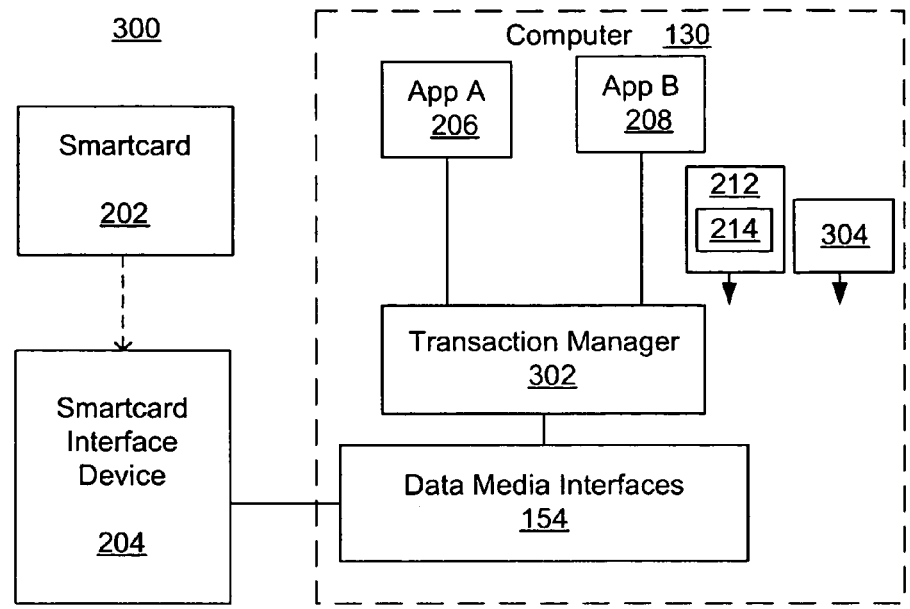
FIG. 3A and FIG. 3B are block diagrams depicting exemplary improved systems that are configured to support access to a smartcard or other like portable mechanism using transaction manager logic.

Attention is drawn to FIG. 3A, which is a block diagram depicting an exemplary improved system 300 that is configured to support access to smartcard 202 or other like portable mechanism using transaction manager logic 302.

Transaction manager logic 302 is configured to support an operation of either App A 206 or App B 208 that requires access to smartcard 202. In addition to providing arbitration features, e.g., similar to arbitration logic 210, transaction manager 302 also establishes and enforces exclusive use periods. Here, for example, assume that App A 206 sends transaction 212 (i.e. some command sequence) to transaction manager 302 at a time when smartcard 202 is not being accessed and is therefore accessible to support an operation of App A 206. Transaction manager 302 will grant access of smartcard 202 to App A 206 and smartcard 202 will receive, and process accordingly, initialization sequence 214. Transaction manager 302 will make the access grant exclusive to App A 206 for a period of time, i.e., during an exclusive use period. Thereafter, and during the exclusive use period, App A 206 may generate additional command sequences 304 that do not include initialization sequence 214 and consequently smartcard 202 need not perform associated processing typically required by initialization sequence 214.

The length of an exclusive use period may be static, dynamic, programmable, and/or vary depending on the smartcard, the computer, the logic, the requesting entity, the operation, the transaction, usage/access traffic levels, processing levels/events/interrupts, date/time, etc. In certain implementations, for example, establishing an exclusive use period may be automatic for all operations, or selectively used for one or more particular operations. In still other implementations, for example, an exclusive use period may apply to all requesting entities, or only just certain selected requesting entities.

Figure 3B:
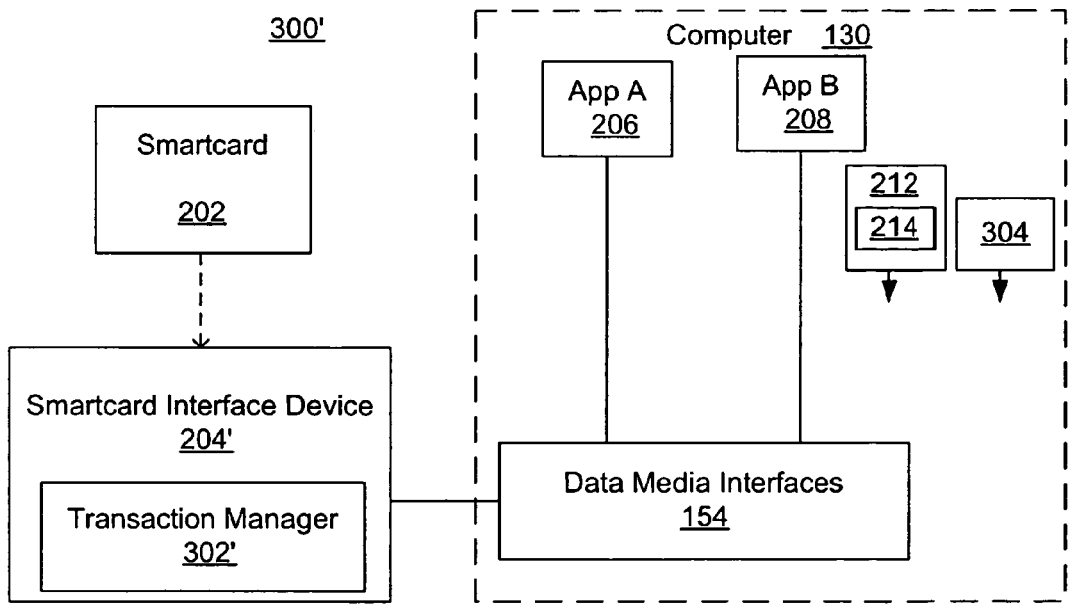

With attention to FIG. 3B, it can be seen that in certain implementations all or part of the transaction manager logic functionality may be accomplished outside of computer 130, for example, in a smartcard interface device or other type of device. Here, system 300' includes smartcard interface device 204' having therein transaction manager 302' that is configured to receive access requests from App A 206 and/or App B 208, via data media interfaces 154. Transactions 212 and 304 would then be provided to transaction manager 302' and handled accordingly.

Figure 4:
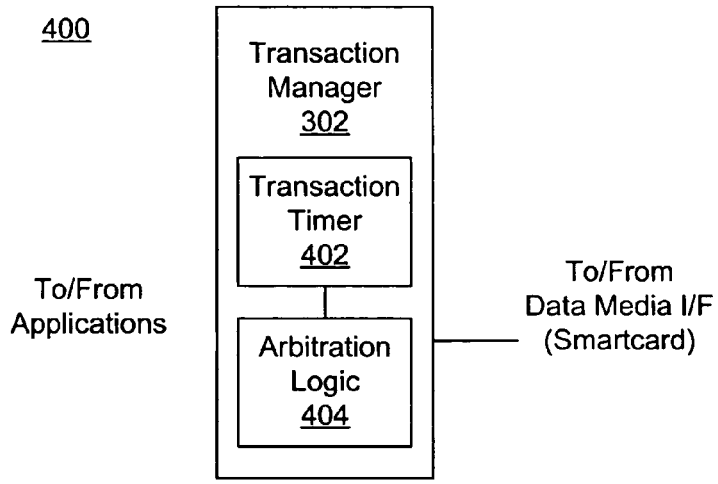
FIG. 4 is a block diagram depicting certain exemplary features within transaction manager logic, for example, as in FIG. 3A.

Reference is now made to FIG. 4, which is a block diagram depicting certain exemplary features within transaction manager logic, for example, as in FIG. 3A. Here, system 400 includes transaction manager logic 302. Illustratively depicted within transaction manager logic 302 is transaction timer logic 402 and arbitration logic 404.

Arbitration logic 404 is configured to allow a selected entity to access smartcard 202 and to deny access to other entities while the smartcard is being accessed by the selected entity. Arbitration logic 404 is operatively coupled to transaction timer logic 402 such that when access is granted to the selected entity, transaction timer logic 402 establishes an exclusive use period for that entity. The exclusive use period may be re-established/reset/re-started for each subsequent transaction 304. In this manner, for example, a plurality of the adjacent or overlapping exclusive use periods essentially are combined together to allow an entity to complete a multiple transaction operation. In certain implementations, the number of exclusive use periods and/or overall resulting exclusive use time may be limited for all or certain operations/entities. Once an exclusive use period ends, however, arbitration logic 404 will grant the next/delayed smartcard access request.

Figure 5:
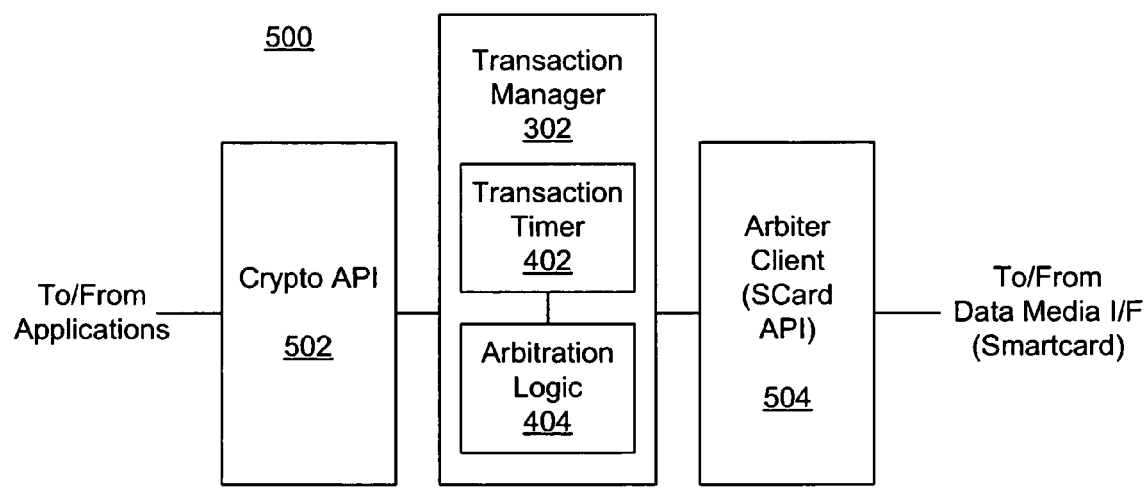
FIG. 5 is a block diagram depicting certain exemplary features within still other transaction manager logic, for example, as in FIG. 3A.

FIG. 5 is a similar block diagram depicting transaction manager logic 302 operatively coupled to operate with a cryptographic API 502 and an arbiter client API 504. Here, the transaction timer logic 402 and arbitration logic 404 may be shimmed, for example, to operate within a conventional operating system environment. Here, smartcard access requests from various entities are provided through a conventional Crypto API 502 and further handled by a conventional arbiter client API (e.g., a Smartcard (SCard) API).

Figure 6:
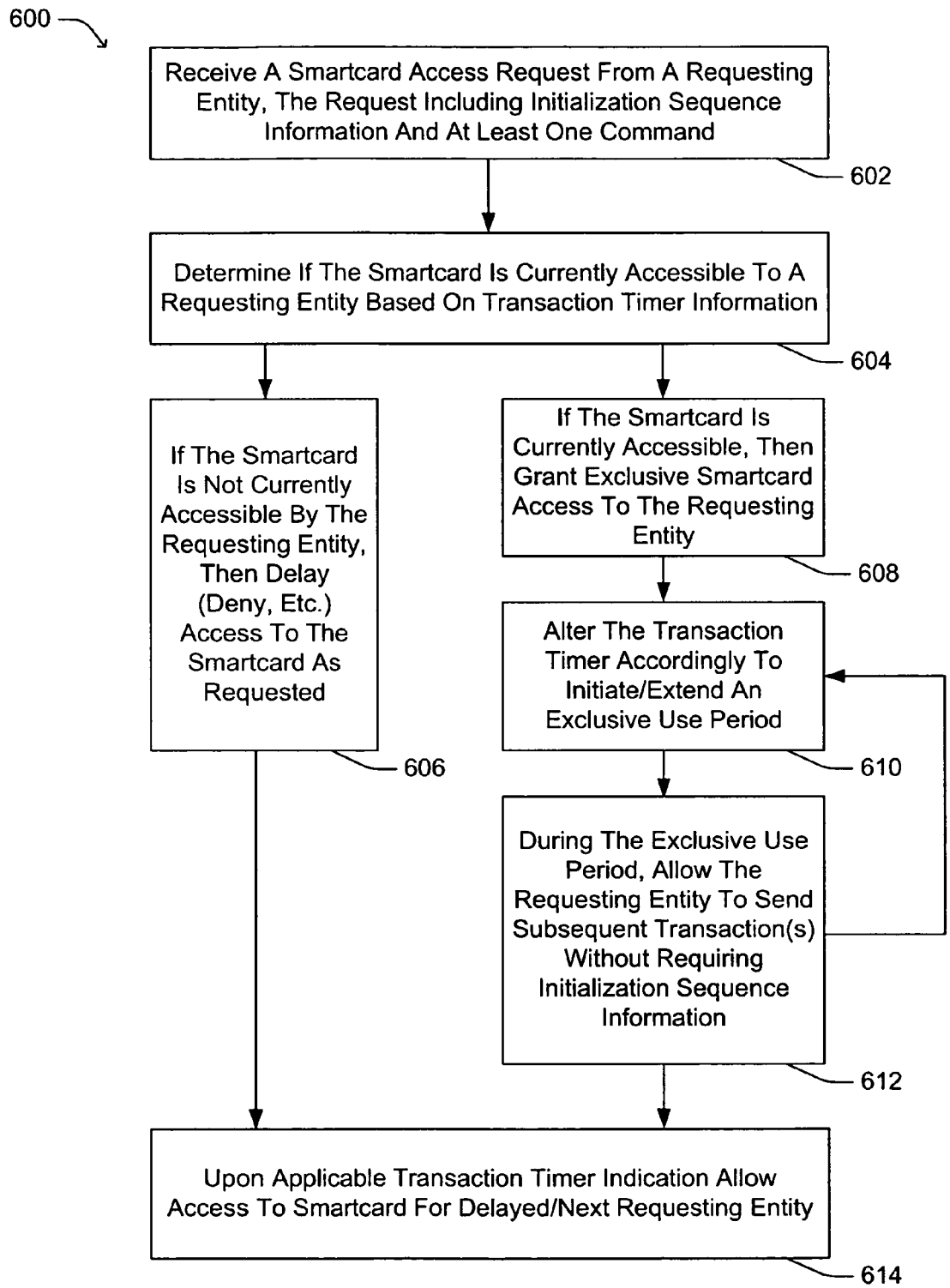
FIG. 6 is a flow diagram depicting certain exemplary acts associated with a method for use in transaction manager logic, for example, as in FIGS. 3-5.

Attention is now drawn to FIG. 6, which is a flow diagram depicting certain exemplary acts associated with a method 600 for use in transaction manager logic 302 (302').

In act 602, a smartcard access request (e.g., transaction 212) is received from a requesting entity. In act 604 it is determined if the smartcard is currently accessible for the received access request and/or entity based on transaction timer information.

If it is determined in act 604 that the smartcard is not currently accessible by the requesting entity, e.g., another entity currently has exclusive access, then in accord with act 606 the access request is delayed, denied, etc.

If it is determined in act 604 that the smartcard is currently accessible by the requesting entity, e.g., no other entity currently has exclusive access, then in accord with act 608 exclusive access is granted to the requesting entity. As such, in act 610, a transaction timer is altered or otherwise arranged to initiate or extend an exclusive use period. In act 612, during the exclusive use period the requesting entity granted the exclusive access is allowed to send one or more subsequent transactions that do not include initialization sequence information. As further illustrated, act 612 may lead back to act 610 wherein the exclusive use period is re-initiated or otherwise extended, for example.

When an exclusive use period ends, then as in act 614, exclusive or other type access may then be granted for the next entity's smartcard access request.

In certain implementations, the requesting entity that has been granted access to smartcard 202 may also be configured to voluntary relinquish the grant prior to the end of the exclusive use period by indicating such to transaction manager 302.

Although some preferred implementations of the various methods and apparatuses have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims.

What is claimed is:

1. A non-volatile computer memory having instructions stored thereon, which when executed by a processor of a computing device, cause the computing device to perform a method comprising:

arbitrating access to a smartcard by selectively granting a first application, in response to receiving an access request from the first application, access to the smartcard, wherein the request includes an initial transaction comprising an initiating sequence and a command sequence, wherein said initiating sequence is configured to transition the smartcard into a first state, and wherein the command sequence is configured for processing in the first state;

configuring, in response to the arbitrating, an exclusive use period having a maximum duration of time, wherein the configuring comprises starting a timer logic corresponding to the maximum duration of time, wherein the exclusive use period defines a duration of time to which the first application has exclusive and undivided use of the smartcard, and wherein the configuring further comprises calculating the maximum duration of time using (i) information identifying the smartcard, (ii) usage information of the smartcard, (iii) information identifying the first application, and (iv) usage information of the first application accepting, during said exclusive use period, at least one subsequent transaction from the first application, wherein said at least one subsequent transaction includes a second command sequence and does not include said initiating sequence, and wherein the second command sequence is configured for processing in the first state;

reconfiguring, after said accepting at least one subsequent transaction, said exclusive use period, wherein the reconfiguring comprises restarting said timer logic to result in a longer period of time to allow the at least one subsequent transaction to be processed;

receiving, during said exclusive use period, at least one other transaction from a second application; and halting, at least temporarily, during the exclusive use period, said at least one other transaction, wherein the halting further comprises preventing the smartcard from being put into a second state by the second application until after expiration of the exclusive use period.

2. The non-volatile computer memory as recited in claim 1, having further instructions stored thereon, which when executed by the processor of the computing device, cause the computing device to perform additional method steps comprising:

causing said smartcard to process said initial transaction and said at least one subsequent transaction during said timed exclusive use period.

* * * * *